(12) United States Patent
Hayakawa

(10) Patent No.: US 11,383,700 B2
(45) Date of Patent: Jul. 12, 2022

(54) VEHICLE TRAVEL CONTROL DEVICE AND VEHICLE TRAVEL CONTROL METHOD FOR PARKING

(71) Applicants: Nissan Motor Co., Ltd., Yokohama (JP); Renault S.A.S., Boulogne-Billancourt (FR)

(72) Inventor: Yasuhisa Hayakawa, Kanagawa (JP)

(73) Assignees: Nissan Motor Co., Ltd., Yokohama (JP); Renault S.A.S., Boulogne-Billancourt (FR)

( * ) Notice: Subject to any disclaimer, the term of this patent is extended or adjusted under 35 U.S.C. 154(b) by 0 days.

(21) Appl. No.: 17/296,850

(22) PCT Filed: Dec. 3, 2018

(86) PCT No.: PCT/IB2018/001491
§ 371 (c)(1),
(2) Date: May 25, 2021

(87) PCT Pub. No.: WO2020/115517
PCT Pub. Date: Jun. 11, 2020

(65) Prior Publication Data
US 2022/0017072 A1   Jan. 20, 2022

(51) Int. Cl.
| | | |
|---|---|---|
| *B60Q 1/48* | (2006.01) | |
| *B60W 30/06* | (2006.01) | |
| *G06V 20/58* | (2022.01) | |
| *B60Q 1/50* | (2006.01) | |
| *B60W 40/105* | (2012.01) | |

(Continued)

(52) U.S. Cl.
CPC .............. *B60W 30/06* (2013.01); *B60Q 1/525* (2013.01); *B60W 40/105* (2013.01); *F21S 10/06* (2013.01); *G05D 1/0011* (2013.01); *G06V 20/58* (2022.01); *B60Q 2400/20* (2013.01); *B60Q 2400/50* (2013.01); *B60W 2554/4041* (2020.02); *B60W 2554/80* (2020.02); *G05D 2201/0213* (2013.01)

(58) Field of Classification Search
CPC .............. B60W 30/06; B60W 40/105; B60W 2554/4041; B60W 2554/80; B60Q 1/525; B60Q 2400/20; B60Q 2400/50; F21S 10/06; G05D 1/0011; G05D 2201/0213; G06V 20/58
See application file for complete search history.

(56) References Cited

U.S. PATENT DOCUMENTS

| | | |
|---|---|---|
| 6,285,778 B1 | 9/2001 | Nakajima et al. |
| 2003/0147247 A1 | 8/2003 | Koike |

(Continued)

FOREIGN PATENT DOCUMENTS

| | | |
|---|---|---|
| DE | 102016208634 A1 | 11/2017 |
| DE | 102016014709 A1 | 6/2018 |

(Continued)

*Primary Examiner* — Toan N Pham
(74) *Attorney, Agent, or Firm* — Young Basile Hanlon & MacFarlane, P.C.

(57) ABSTRACT

A vehicle travel control method includes, when controlling a vehicle having an autonomous travel control function to travel autonomously, detecting whether or not an object is present around the vehicle and displaying a predetermined pattern corresponding to a detection range at a certain position on a road surface toward the detection range so that the predetermined pattern is visible.

8 Claims, 16 Drawing Sheets

(51) Int. Cl.
*F21S 10/06*  (2006.01)
*G05D 1/00*  (2006.01)

(56) References Cited

U.S. PATENT DOCUMENTS

| | | | |
|---|---|---|---|
| 2008/0175012 A1* | 7/2008 | Shimaoka | B60Q 1/085 |
| | | | 362/464 |
| 2017/0166165 A1 | 6/2017 | Schindler et al. | |
| 2018/0065537 A1* | 3/2018 | Abrams | H05B 47/19 |
| 2018/0148094 A1 | 5/2018 | Mukaiyama | |
| 2018/0257548 A1* | 9/2018 | Suzuki | B60Q 1/50 |
| 2019/0066510 A1* | 2/2019 | Salter | G01S 17/931 |
| 2019/0270405 A1 | 9/2019 | Fukumoto | |

FOREIGN PATENT DOCUMENTS

| | | |
|---|---|---|
| EP | 2233356 A1 | 9/2010 |
| EP | 2295281 A1 | 3/2011 |
| EP | 3216653 A1 | 9/2017 |
| JP | H05-201298 A | 8/1993 |
| JP | 2003-231438 A | 8/2003 |
| JP | 2008-007079 A | 1/2008 |
| JP | 2008-143510 A | 6/2008 |
| JP | 2009-149152 A | 7/2009 |
| JP | 2016-101797 A | 6/2016 |
| JP | 2017-506756 A | 3/2017 |
| JP | 2018-149857 A | 9/2018 |
| JP | 2018-177044 A | 11/2018 |
| WO | 2018/092710 A1 | 5/2018 |

\* cited by examiner

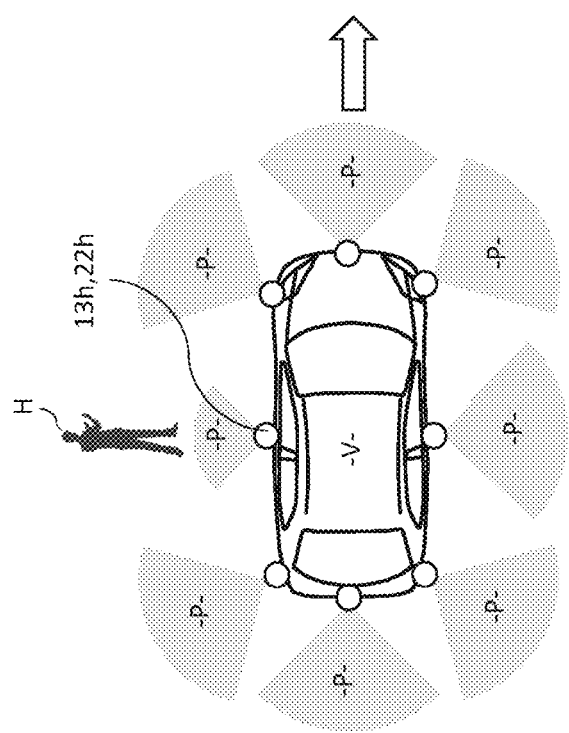

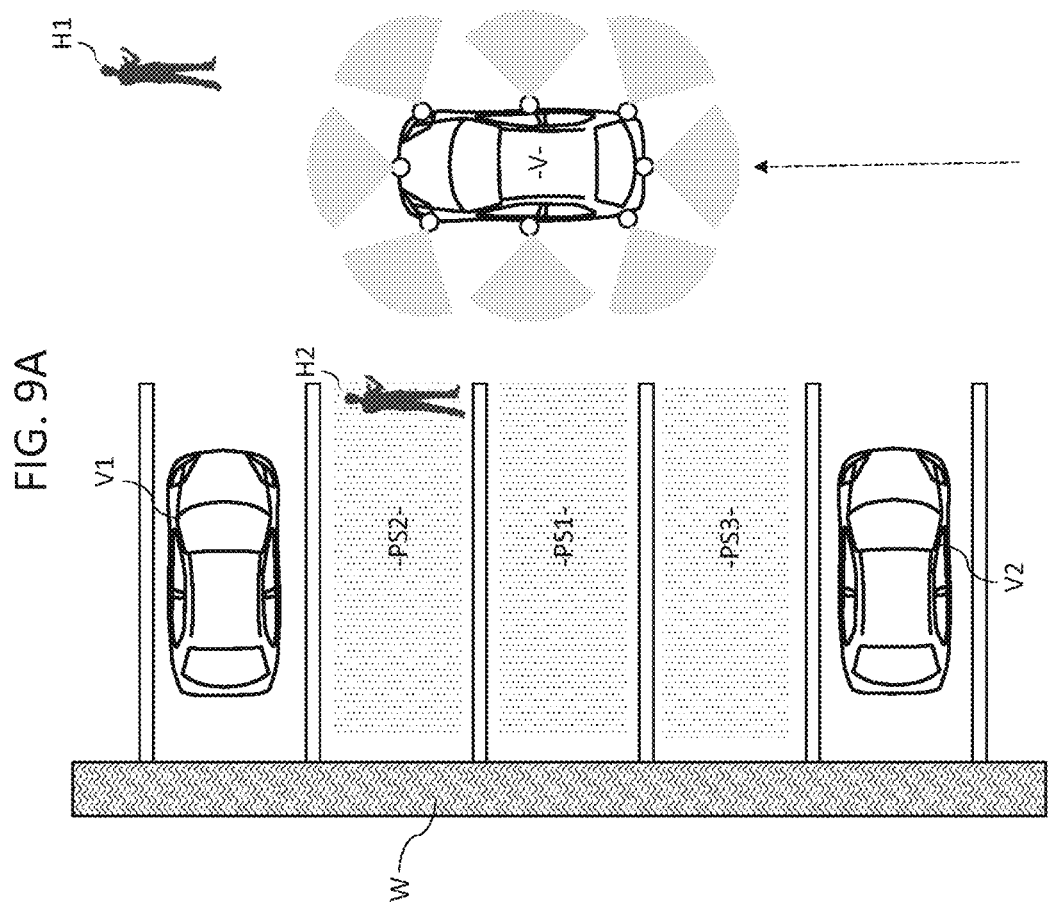

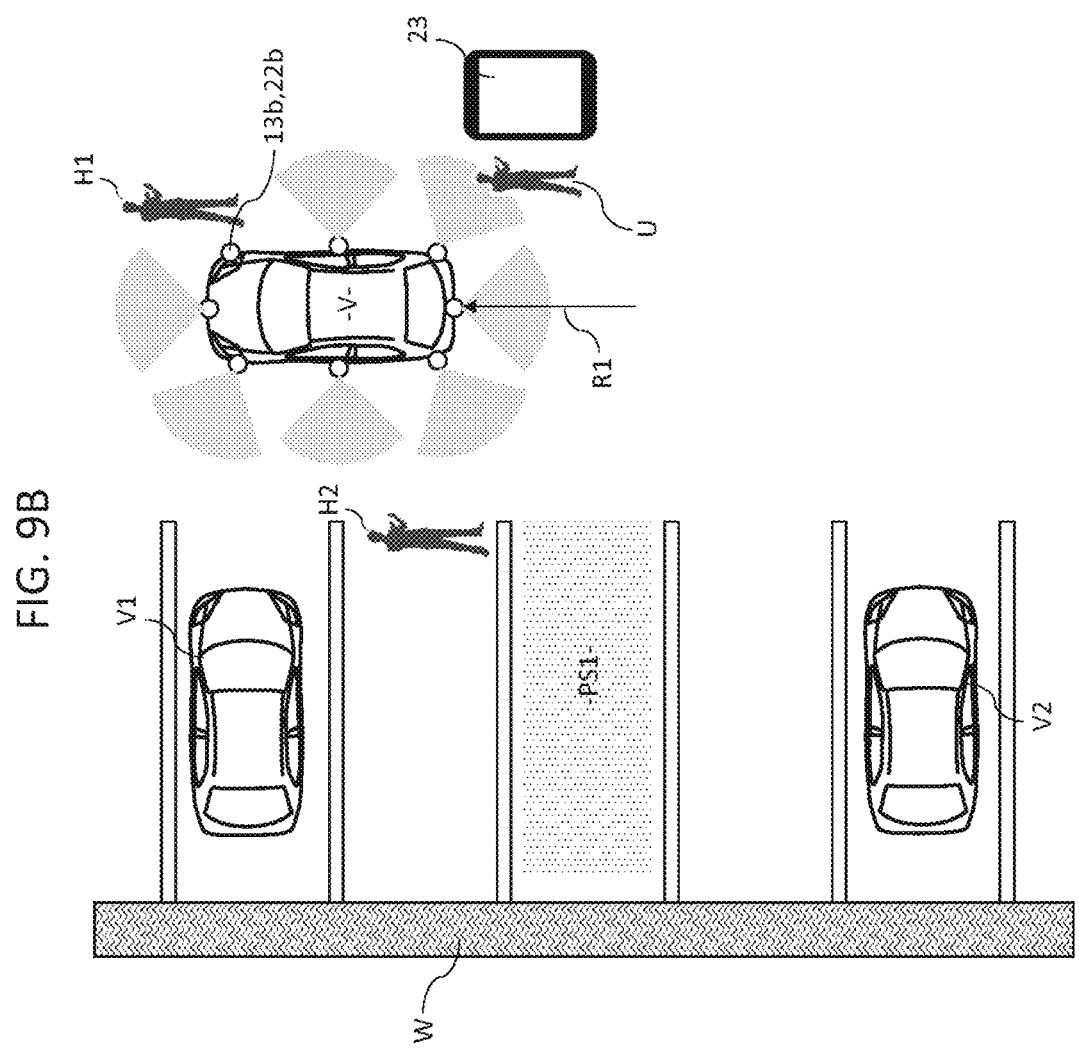

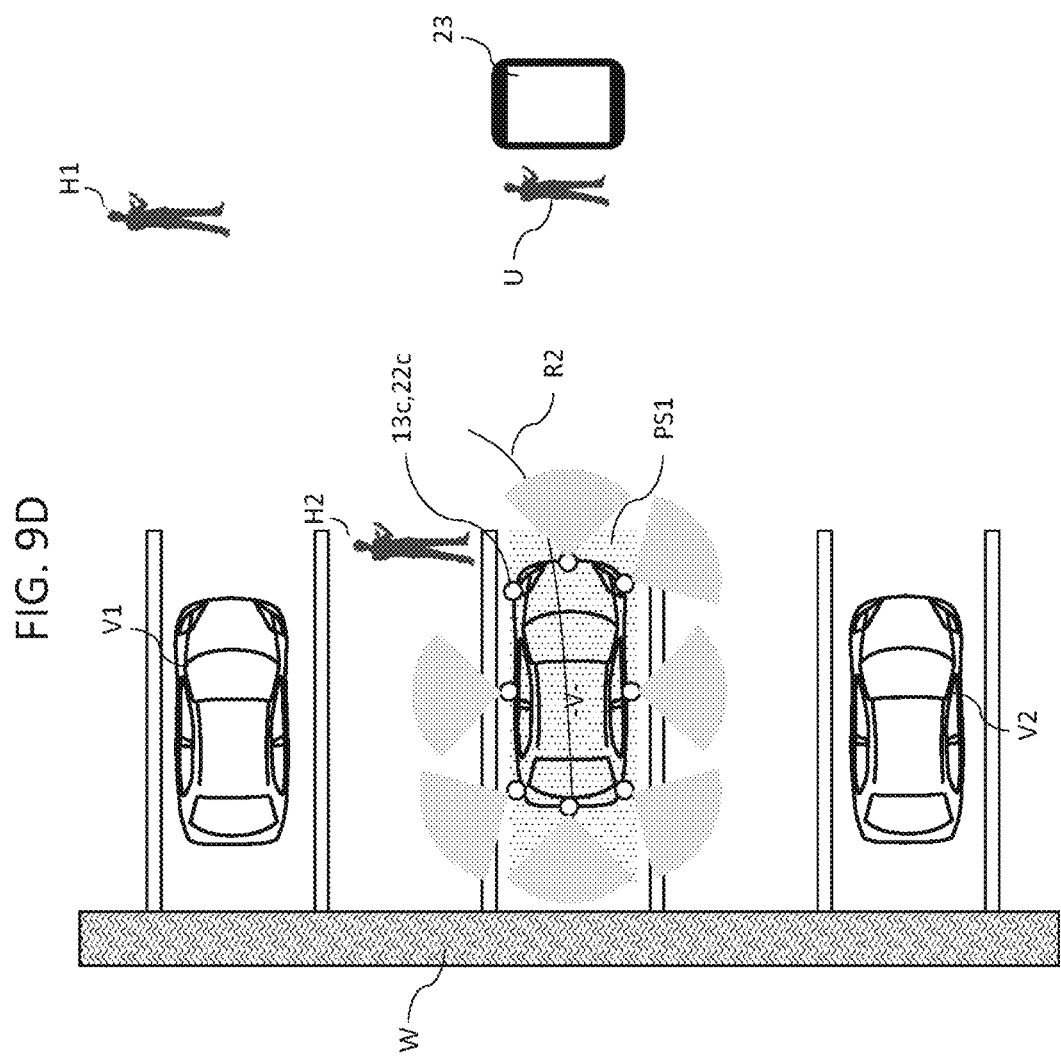

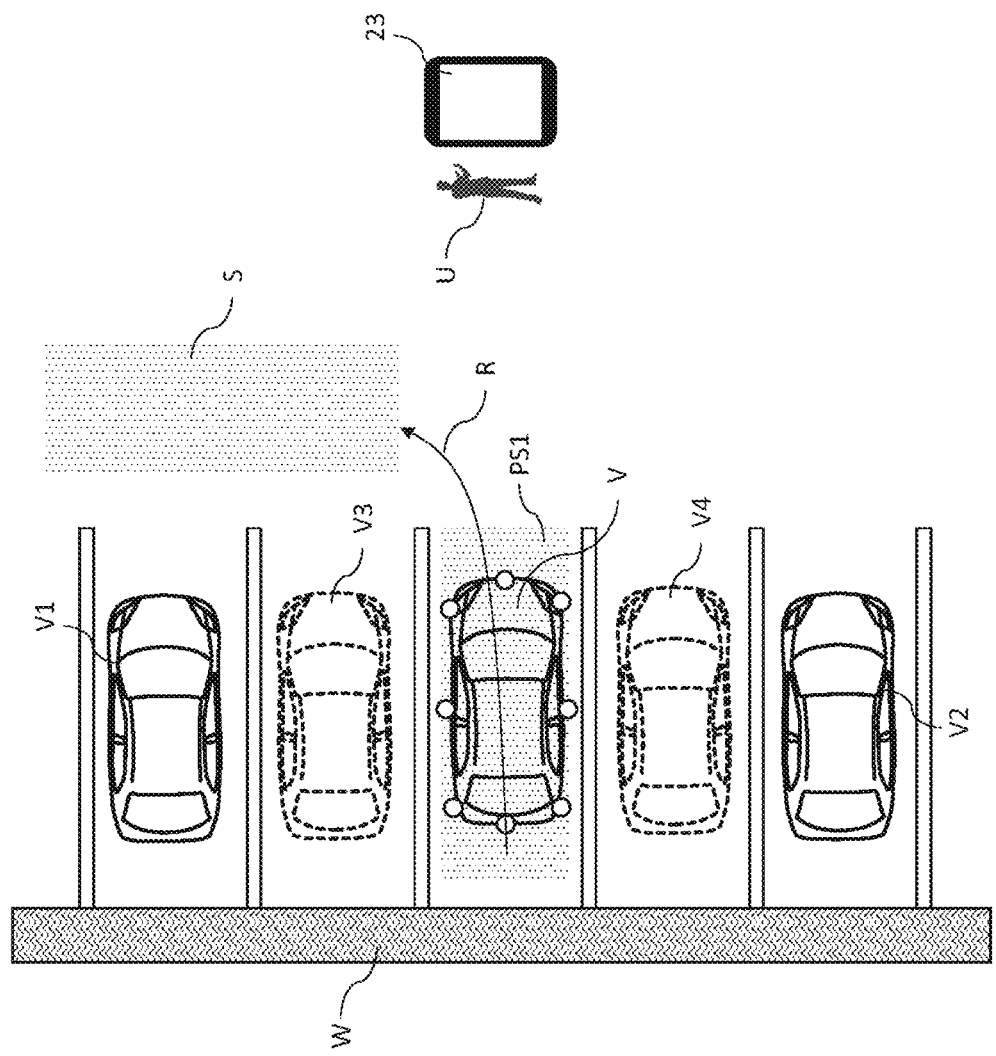

VEHICLE TRAVEL CONTROL DEVICE AND VEHICLE TRAVEL CONTROL METHOD FOR PARKING

TECHNICAL FIELD

The present invention relates to a vehicle travel control method and a vehicle travel control apparatus that control a subject vehicle to travel by autonomous travel control.

BACKGROUND

A safety control device is known, which is configured such that when a parked subject vehicle starts, a predetermined pattern is projected onto a road surface in order to arouse attention of other vehicles traveling in the parking lot and pedestrians to the start operation of the subject vehicle (JP2016-101797A).

SUMMARY

In the above prior art, however, a predetermined pattern for arousing attention to the start operation of the subject vehicle is simply projected onto the road surface, and the predetermined pattern is not a pattern that represents the detection range for an obstacle. Accordingly, pedestrians or the like cannot recognize whether or not the vehicle actually detects the pedestrians or the like.

A problem to be solved by the present invention is to provide a vehicle travel control method and a vehicle travel control apparatus with which when autonomous travel control is executed, the detection range for an object actually detected by the subject vehicle can be recognized by the object.

The present invention solves the above problem through, when controlling a vehicle having an autonomous travel control function to travel autonomously, detecting whether or not an object is present around the vehicle and displaying a predetermined pattern corresponding to a detection range at a certain position on a road surface toward the detection range so that the predetermined pattern is visible.

According to the present invention, an object such as a person present around the vehicle can visually recognize the display of the predetermined pattern displayed at a certain position on the road surface thereby to recognize the detection range for the object detected by the vehicle.

BRIEF DESCRIPTION OF THE DRAWINGS

FIG. 5C is a plan view (part 3) illustrating an example of display form of the patterns which are displayed at certain positions on the road surface by the pattern display devices of FIG. 1;

FIG. 9A is a plan view (part 1) illustrating an example of remote reverse parking executed in the remote parking system of FIG. 1;

FIG. 9B is a plan view (part 2) illustrating an example of remote reverse parking executed in the remote parking system of FIG. 1;

FIG. 9D is a plan view (part 4) illustrating an example of remote reverse parking executed in the remote parking system of FIG. 1; and FIG. 10 is a plan view illustrating an example of remote exit executed in the remote parking system of FIG. 1.

DETAILED DESCRIPTION

Figure 1:
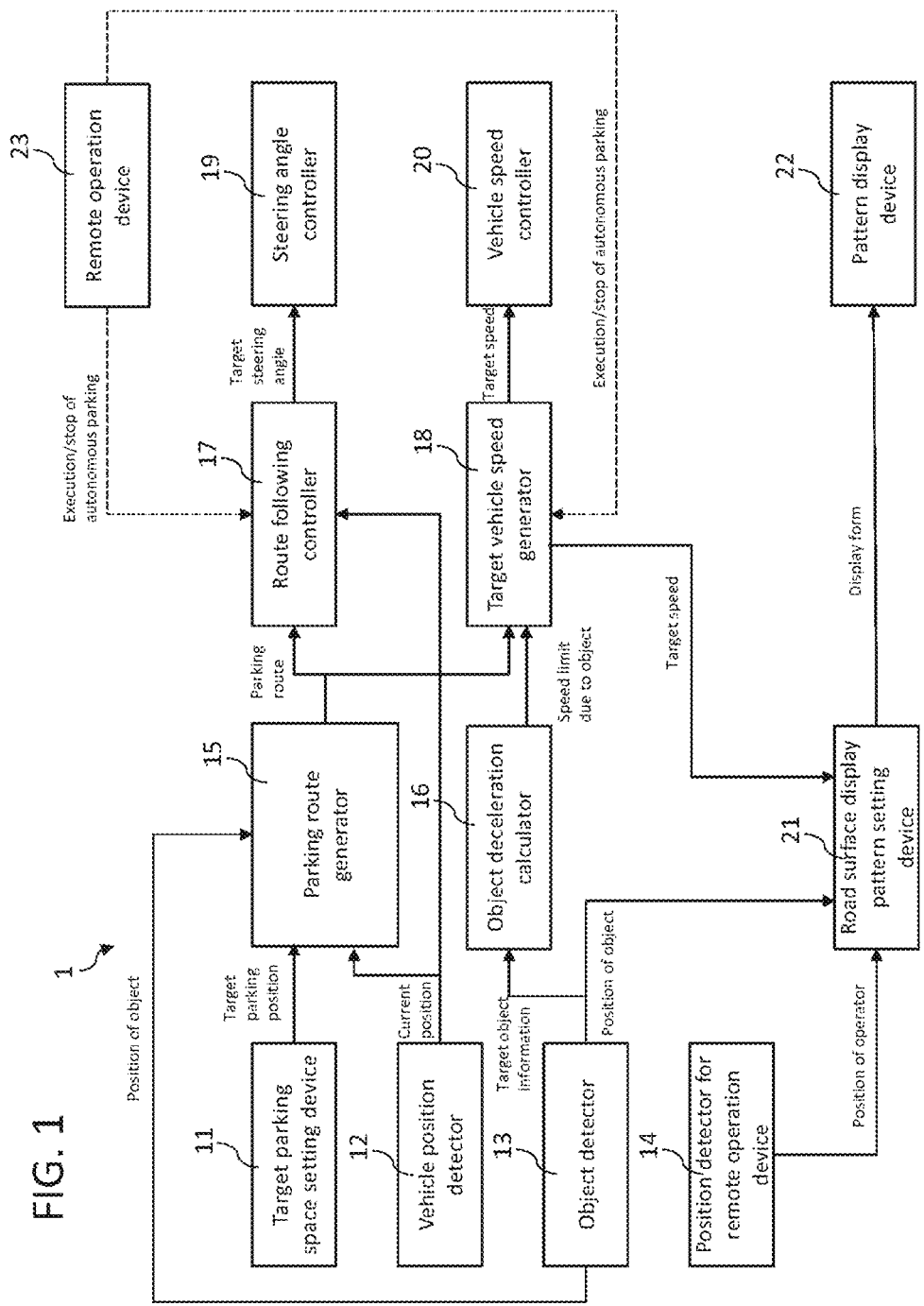
FIG. 1 is a block diagram illustrating a remote parking system to which the vehicle travel control method and vehicle travel control apparatus of the present invention are applied.

Hereinafter, one or more embodiments of the present invention will be described with reference to the drawings. FIG. 1 is a block diagram illustrating a remote parking system 1 to which the vehicle travel control method and vehicle travel control apparatus of the present invention are applied. The vehicle travel control method and vehicle travel control apparatus according to the present invention can be applied not only to remote parking but also to usual autonomous travel control. The present invention will be described herein with reference to the remote parking.

In the present specification, "parking" refers to continuously stopping a vehicle in a parking space, but the term "parking route" encompasses not only a route for entry into a parking space or a garage but also a route for exit from a parking space or a garage. In this sense, the "vehicle travel control method and vehicle travel control apparatus used when parking" according to the present invention encompass both the travel control of a vehicle at the time of entry into a parking space or a garage and the travel control of a vehicle at the time of exit from a parking space or a garage. The entry into a parking space or a garage may be simply referred to as entry or entering, and the exit from a parking space or a garage may be simply referred to as exit or exiting. Autonomous travel control or autonomous parking control refers to controlling a vehicle to travel or park (enter or exit a parking space or a garage) through automated or autonomous control executed by an onboard travel control apparatus without relying on a driver's driving operation.

The remote parking system 1 according to one or more embodiments of the present invention is a system for performing the operation of entry into or exit from a parking space or a garage by the autonomous travel control when performing the operation. During the operation, the driver gets off the vehicle and continues to transmit an execution command from a remote operation device while confirming safety, thereby to maintain the autonomous parking control. When the vehicle may collide with an obstacle, the autonomous parking control is stopped by transmitting a stop command or stopping transmission of the execution command. In the following description, the autonomous travel control mode for entry with the use of remote operation will be referred to as a remote entry mode, and the autonomous travel control mode for exit with the use of remote operation will be referred to as a remote exit mode.

In a narrow parking space in which side doors cannot be fully opened, such as a narrow garage or a parking lot in which, as illustrated in FIG. 10, for example, other vehicles V3 and V4 are parked on both sides of a subject vehicle V, it may be difficult for the driver to get on or get off the vehicle. To enable parking even in such a case, the remote entry mode or remote exit mode is used together with the remote operation. In the case of entry into a parking space, after the remote entry mode is initiated to calculate the entry route into the selected parking space and start the autonomous entry control, the driver gets off the vehicle while carrying the remote operation device and continues to transmit the execution command from the remote operation device to complete the entry into the selected parking space. On the other hand, in the case of exit from the parking space, the driver turns on the internal combustion engine or drive motor of the vehicle using the remote operation device carried by the driver, and after the remote exit mode is initiated to calculate the exit route to a selected exit position and start the autonomous exit control, the driver continues to transmit the execution command from the remote operation device to complete the exit from the parking space and thereafter gets on the vehicle. Thus, the remote parking system 1 according to one or more embodiments of the present invention is a system that has the remote entry mode with the use of such a remote operation and the remote exit mode also with the use of remote operation.

The remote parking system 1 according to one or more embodiments of the present invention includes a target parking space setting device 11, a vehicle position detector 12, an object detector 13, a position detector 14 for remote operation device, a parking route generator 15, an object deceleration calculator 16, a route following controller 17, a target vehicle speed generator 18, a steering angle controller 19, a vehicle speed controller 20, a road surface display pattern setting device 21, a pattern display device 22, and a remote operation device 23. Each configuration will be described below.

In the remote entry mode, the target parking space setting device 11 searches for parking spaces existing around the subject vehicle, allows the operator to select a desired parking space from among available parking spaces, and outputs positional information of the parking space (such as the coordinates of a relative position from the current position of the subject vehicle and the latitude/longitude) to the parking route generator 15. In the remote exit mode, the target parking space setting device 11 searches for exit spaces existing around the subject vehicle which is currently parked, allows the operator to select a desired exit space from among available exit spaces, and outputs positional information of the exit space (such as the coordinates of a relative position from the current position of the subject vehicle and the latitude/longitude) to the parking route generator 15. The exit space refers to a temporary stop position S for the subject vehicle at which, as illustrated in FIG. 10, the operator gets on the subject vehicle after performing the exit operation in the remote exit mode.

To achieve the above-described functions, the target parking space setting device 11 includes an input switch that inputs and operates the remote entry mode or the remote exit mode, a plurality of cameras (not illustrated, the object detector 13 to be described later may serve as the cameras) that capture images around the subject vehicle, a computer that is installed with a software program for searching for available parking spaces from image data captured by the cameras, and a touch panel-type display that displays an image including the available parking spaces. When an operator such as a driver selects the remote entry mode using the input switch, the cameras acquire the image data around the subject vehicle, and the display displays the image including the available parking spaces. When the operator selects a desired parking space from among the displayed parking spaces, the target parking space setting device 11 outputs the positional information of the parking space (such as the coordinates of a relative position from the current position of the subject vehicle and the latitude/longitude) to the parking route generator 15. Upon search for the available parking spaces, when the map information stored in a navigation device includes parking lot information having detailed positional information, the parking lot information may be used. When the operator such as the driver starts the internal combustion engine or drive motor of the subject vehicle using the remote operation device 23 and selects the remote exit mode via the input switch of the remote operation device 23, the cameras acquire the image data around the subject vehicle, and the display of the remote operation device 23 displays the image including the available exit spaces. When the operator selects a desired exit space from among the displayed exit spaces, the target parking space setting device 11 outputs the positional information of the exit space (such as the coordinates of a relative position from the current position of the subject vehicle and the latitude/longitude) to the parking route generator 15.

The vehicle position detector 12 is composed of a GPS unit, a gyro sensor, a vehicle speed sensor, and other components. The vehicle position detector 12 detects radio waves transmitted from a plurality of satellite communications using the GPS unit to periodically acquire positional information of the subject vehicle and detects the current position of the subject vehicle on the basis of the acquired positional information of the subject vehicle, the angle change information acquired from the gyro sensor, and the vehicle speed acquired from the vehicle speed sensor. The positional information of the subject vehicle detected by the vehicle position detector 12 is output to the parking route generator 15 and the route following controller 17 at predetermined time intervals.

Figure 2:
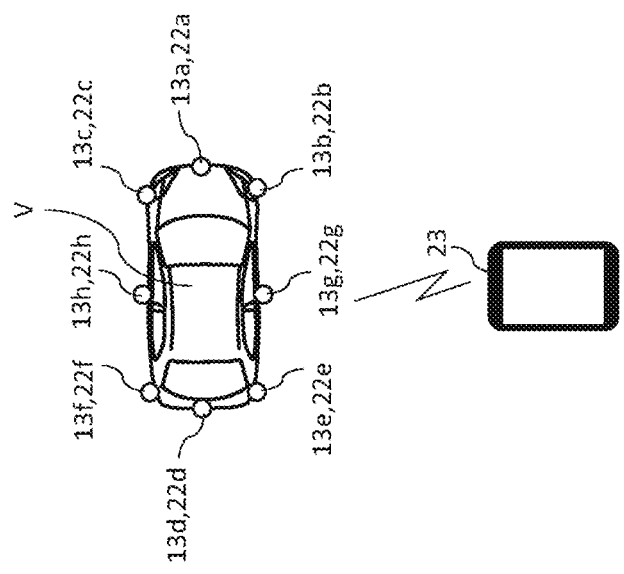
FIG. 2 is a plan view illustrating a remote operation device and a state in which object detectors and pattern display devices of FIG. 1 are attached to a vehicle.

The object detector 13 is configured to search for whether or not an object such as an obstacle is present around the subject vehicle. The object detector 13 includes a camera, radar (such as millimeter-wave radar, laser radar, or ultrasonic radar), sonar, or the like or a combination thereof. The camera, radar, sonar, or the like or a combination thereof is attached to an outer panel part of the subject vehicle. FIG. 2 is a plan view illustrating an example of a state in which object detectors 13a to 13h are attached to the vehicle V. In this example, the object detectors 13a to 13h are attached to eight respective sites of the center 13a and both sides 13b and 13c of the front bumper, the center 13d and both sides 13e and 13f of the rear bumper, and the sill outers 13g and 13h below the right and left center pillars. The object detectors 13a to 13h may be collectively referred to as the object detector or detectors 13. The sites to which the object detectors 13 are attached and the number of the object detectors 13 as illustrated in FIG. 2 are merely an example, and the object detectors 13 may also be attached to other sites than those illustrated in the figure. The number of sites to which the object detectors 13 are attached may also be less than eight or nine or more. The object detector 13 further includes a computer installed with a software program for specifying the position of an object detected by the camera, radar, or the like, and the specified object information (target object information) and its positional information (such as the coordinates of a relative position from the current position of the subject vehicle and the latitude/longitude) are output to the parking route generator 15, the object deceleration calculator 16, and the road surface display pattern setting device 21.

Figure 4:
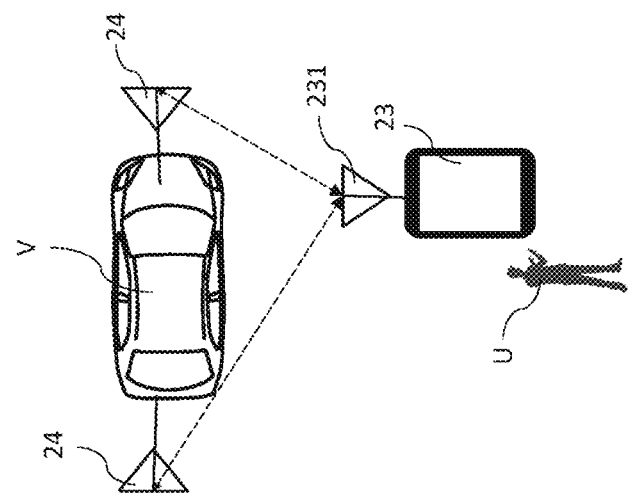
FIG. 4 is a diagram illustrating an example of a position detector for the remote operation device of FIG. 1.

Referring again to FIG. 1, the position detector 14 for the remote operation device 23 is a device for specifying the position of the remote operation device 23, which will be described later, when the remote operation device 23 is taken out of the vehicle. As illustrated in FIG. 4, for example, the position detector 14 is composed of at least two antennas 24 and 24 provided at different positions of the subject vehicle V, an antenna 231 of the remote operation device 23, sensors that detect radio field intensities between the antennas 24 and 24 of the vehicle V and the antenna 231 of the remote operation device, and a computer installed with a software program for calculating the position of the remote operation device 23 from the radio field intensities detected by the sensors using a triangulation method or the like. The radio waves for specifying the position of the remote operation device 23 are continuously transmitted at predetermined time intervals, and the position of the remote operation device 23, which changes momentarily, with respect to the subject vehicle V is specified, for example, as relative positional information to the subject vehicle V. The radio waves for specifying the position of the remote operation device 23 can be generated using the execution command signal from the remote operation device 23.

The radio waves for specifying the position of the remote operation device 23 may be transmitted from the antenna 231 of the remote operation device 23 to the antennas 24 and 24 of the vehicle V at predetermined time intervals or may also be transmitted from the antennas 24 and 24 of the vehicle V to the antenna 231 of the remote operation device 23 at predetermined time intervals. In the former case, the vehicle V is provided with the sensors that detect the radio field intensities between the antennas 24 and 24 of the vehicle V and the antenna 231 of the remote operation device and the computer installed with a software program for calculating the position of the remote operation device 23 from the radio field intensities detected by the sensors using a triangulation method or the like. In the latter case, the remote operation device 23 is provided with the sensors and the computer. The positional information of the remote operation device (positional information relative to the subject vehicle V) detected by the position detector 14 for the remote operation device 23 is output to the road surface display pattern setting device 21. The remote operation device 23 is taken out of the vehicle by the operator, and therefore the positional information of the remote operation device 23 detected by the position detector 14 for the remote operation device 23 is also the positional information of the operator.

The parking route generator 15 receives the size of the subject vehicle (such as a vehicle width, a vehicle length, or a minimum turning radius) which is preliminarily stored, the target parking position (which refers to the positional information of the parking space in the case of the remote entry mode or the positional information of the exit space in the case of the remote exit mode, here and hereinafter) from the target parking space setting device 11, the current positional information of the subject vehicle from the vehicle position detector 12, and the positional information of an object (obstacle) from the object detector 13 and calculates a parking route from the current position of the subject vehicle to the target parking position (the parking route refers to the entry route in the case of the remote entry mode or the exit route in the case of the remote exit mode, here and hereinafter). The parking route is calculated so as not to collide or interfere with an object. FIGS. 9A to 9D are plan views illustrating an example of the remote entry mode. At the current position of the subject vehicle V illustrated in FIG. 9A, when the driver operates the input switch to select the remote entry mode, the target parking space setting device 11 searches for three available parking spaces PS1, PS2, and PS3 and displays an image including these parking spaces on a display. Here, it is assumed that the driver selects the parking space PS1 in response to the displayed image. In this case, the parking route generator 15 calculates entry routes R1 and R2 from the current position illustrated in FIG. 9A to the parking space PS1 illustrated in FIGS. 9B, 9C, and 9D.

On the other hand, at the parking position illustrated in FIG. 10, when other vehicles V3 and V4 are parked on both sides of the subject vehicle V as indicated by dotted lines and it is difficult for the driver to open the door to get on the vehicle, the remote exit mode can be used to control the subject vehicle V to exit the parking space. This will be more specifically described. In the state illustrated in FIG. 10, when the driver starts the internal combustion engine or drive motor of the subject vehicle using the remote operation device 23 and operates the input switch of the remote operation device 23 to select the remote exit mode, the target parking space setting device 11 searches for an available exit space S illustrated in FIG. 10, for example, and displays the exit space S on the display of the remote operation device 23. Here, it is assumed that the driver selects the exit space S in response to the display. In this case, the parking route generator 15 calculates an exit route R from the current position illustrated in FIG. 10 to the exit space S. Thus, the parking route generator 15 calculates the entry route from the current position to the parking space in the case of the remote entry mode or calculates the exit route from the current position to the exit space in the case of the remote exit mode. Then, the parking route generator 15 outputs the entry route or the exit route to the route following controller 17 and the target vehicle speed generator 18.

Figure 9C:
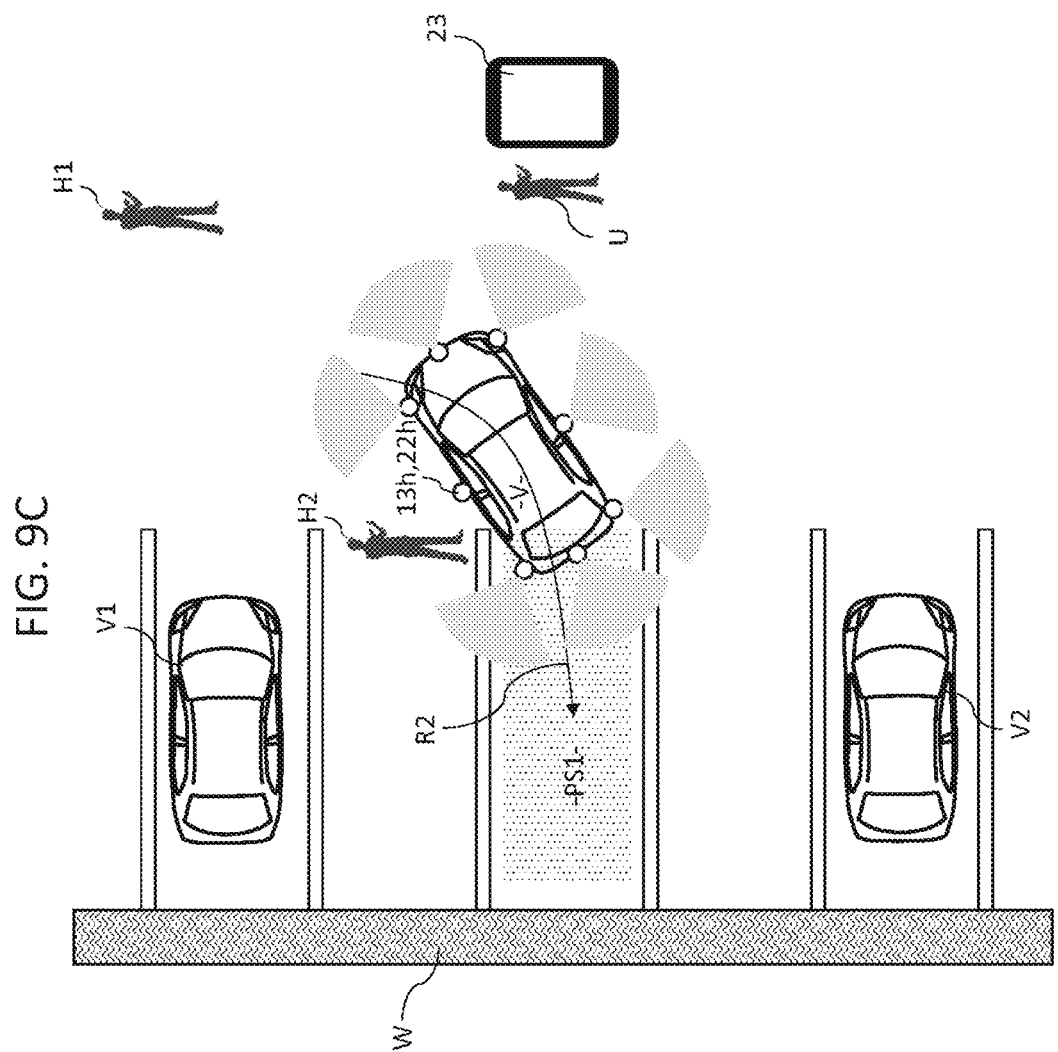
FIG. 9C is a plan view (part 3) illustrating an example of remote reverse parking executed in the remote parking system of FIG. 1.

The object deceleration calculator 16 receives the positional information of obstacles and other objects from the object detector 13 and operates to calculate the time for the subject vehicle to collide with an object (TTC: Time to Collision) on the basis of the distance from the object and the vehicle speed and calculate the deceleration start timing of the subject vehicle. For example, in the remote entry mode illustrated in FIGS. 9A to 9D, when the object as an obstacle is a wall W of the parking lot and the distance from the wall W is a predetermined value or more as illustrated in FIGS. 9A to 9C, the vehicle speed is set to an initial set value, and the vehicle speed of the subject vehicle V is decelerated at the timing when the time TTC for the subject vehicle V to collide with the wall W becomes a predetermined value or less as illustrated in FIG. 9D. This deceleration start timing is output to the target vehicle speed generator 18.

The route following controller 17 calculates, at predetermined time intervals, a target steering angle for the subject vehicle to follow a route along the entry route or the exit route on the basis of the entry route or the exit route from the parking route generator 15 and the current position of the subject vehicle from the vehicle position detector 12. As for the entry routes R1 and R2 of FIGS. 9A to 9D, the route following controller 17 calculates, at a predetermined time interval for each current position of the subject vehicle V, a target steering angle along the entry route R1 for traveling straight ahead from the current position illustrated in FIG. 9A to the position of turn for parking illustrated in FIG. 9B and a target steering angle along the entry route R2 for turning left from the position of turn for parking illustrated in FIG. 9B to the parking position illustrated in FIG. 9C and FIG. 9D and outputs the calculated target steering angles to the steering angle controller 19.

The target vehicle speed generator 18 calculates, at predetermined time intervals, a target vehicle speed for the subject vehicle V to follow a route along the entry route or the exit route on the basis of the entry route or the exit route from the parking route generator 15 and the deceleration start timing from the object deceleration calculator 16. As for the entry routes of FIGS. 9A to 9D, the target vehicle speed generator 18 calculates, at a predetermined time interval for each current position of the subject vehicle V, a target vehicle speed when starting from the current position illustrated in FIG. 9A and stopping at the position of turn for parking illustrated in FIG. 9B, a target vehicle speed when starting (backing) from the position of turn for parking illustrated in FIG. 9B and turning left on the way to the parking position illustrated in FIG. 9C, and a target vehicle speed when approaching the wall W illustrated in FIG. 9D and stopping there and outputs the calculated target vehicle speeds to the vehicle speed controller 20.

The steering angle controller 19 generates a control signal for operating a steering actuator provided in the steering system of the subject vehicle V on the basis of the target steering angle from the route following controller 17. The vehicle speed controller 20 generates a control signal for operating an accelerator actuator provided in the drive system of the subject vehicle V on the basis of the target vehicle speed from the target vehicle speed generator 18. The steering angle controller 19 and the vehicle speed controller 20 are concurrently controlled thereby to execute the autonomous parking control.

The remote operation device 23 is used by an operator U from outside of the vehicle to command whether to continue or stop the execution of the autonomous parking control which is set by the target parking space setting device 11. To this end, the remote operation device 23 has a short-range communication function (such as using the antenna 231 illustrated in FIG. 4) for transmitting an execution continuation command signal or an execution stop signal to the route following controller 17 and the target vehicle speed generator 18 (these may alternatively be the steering angle controller 19 and the vehicle speed controller 20) and performs communication with the antennas 24 and 24 provided in the vehicle V. The remote exit mode requires a start/stop switch for the drive system (internal combustion engine or drive motor) of the subject vehicle V, an input switch for inputting the remote exit mode, and a display for displaying an image including the exit space, and it is therefore preferred to configure the remote operation device 23 using a portable computer with these functions.

When using only the remote entry mode, it suffices that the remote operation device 23 transmits at least a command signal as to whether to continue or stop execution of the autonomous parking control; therefore, for example, a wireless lock/unlock key provided with an execution/stop button for the command signal may be used. A telecommunication network may be used as the means for transmitting the execution continuation command signal or the execution stop signal from the remote operation device 23 to the route following controller 17 and the target vehicle speed generator 18 (these may alternatively be the steering angle controller 19 and the vehicle speed controller 20). A pairing process (process in which the subject vehicle V authenticates the remote operation device 23 to receive a command) is executed via a short-range communication function between the remote operation device 23 and the onboard device (route following controller 17 and target vehicle speed generator 18) of the subject vehicle V, and only when authenticating the remote operation device 23, the subject vehicle V receives the execution continuation command signal or the execution stop signal.

In particular, the remote parking system 1 according to one or more embodiments of the present invention includes the pattern display device 22 and the road surface display pattern setting device 21. The pattern display device 22 displays one or more visible patterns on a road surface. When the object detector 13 detects an object, the road surface display pattern setting device 21 controls the pattern display device 22 so that one or more predetermined patterns corresponding to a detection range for the object are displayed at respective certain positions on the road surface toward the detection range.

The pattern display device 22 is composed of an LED lighting device, a laser light irradiation device, or the like and emits visible light toward the road surface around the subject vehicle V. As illustrated in FIG. 2, for example, the pattern display device 22 composed of an LED lighting device, a laser light irradiation device, or the like can be attached to a position in the vicinity of each of the object detectors 13a to 13h so as to correspond thereto. FIG. 2 is a plan view illustrating an example of a state in which pattern display devices 22a to 22h are attached to the subject vehicle V. In this example, the pattern display devices 22a to 22h are attached to respective vicinities of the above-described object detectors 13a to 13h arranged at eight sites, that is, the eight respective sites of the center 22a and both sides 22b and 22c of the front bumper, the center 22d and both sides 22e and 22f of the rear bumper, and the sill outers 22g and 22h below the right and left center pillars. The sites to which the pattern display devices 22 are attached and the number of the sites as illustrated in FIG. 2 are merely an example, and the pattern display devices 22 may also be attached to other sites than those illustrated in the figure. The number of sites to which the pattern display devices 22 are attached may also be less than eight or nine or more. Additionally or alternatively, LED lighting devices may be provided on the entire circumference of the subject vehicle V, and the display may be performed such that the surroundings of the subject vehicle V are separated into the same segments.

Figure 3:
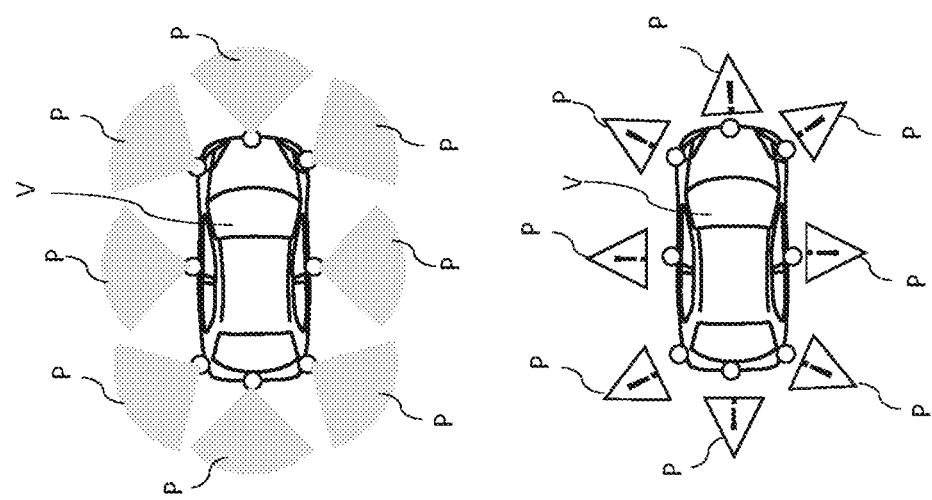
FIG. 3 is a set of plan views illustrating examples of a state in which the pattern display devices of FIG. 1 display patterns at certain positions on a road surface.

The upper and lower diagrams of FIG. 3 are diagrams illustrating examples of patterns P illuminated on the road surface by the pattern display devices 22 which are provided at the eight sites as described above. The example illustrated in the upper diagram of FIG. 3 is an example in which the patterns represent respective detection ranges of the object detectors 13a to 13h, and the example illustrated in the lower diagram of FIG. 3 is an example in which graphic patterns are displayed. The patterns P illustrated in the upper and lower diagrams of FIG. 3 represent those when illuminated by the pattern display devices 22 with the maximum areas. As will be described later, the road surface display pattern setting device 21 can vary the area of display by each pattern display device 22 and can turn on/off any pattern display device 22.

The road surface display pattern setting device 21 sets each pattern P of visible light displayed by the pattern display device 22. When the pattern P of visible light is displayed, a predetermined pattern P corresponding to the detection range of the object detector 13 for an object is displayed at a certain position on the road surface toward the detection range. Here, examples of display form of patterns P which are set by the road surface display pattern setting device 21 will be described. All of the examples of display form fall under the feature of the present invention of "displaying a predetermined pattern P corresponding to a detection range for an object at a certain position on a road surface toward the detection range."

«First Example of Display Form»

FIGS. 5A to 5D are plan views illustrating an example of display form in which patterns P are displayed by respective pattern display devices 22a to 22h at certain positions on the road surface toward the detection ranges of the object detectors 13a to 13h during the execution not only of the autonomous parking control in the remote entry mode as illustrated in FIGS. 9A to 9D but also of general autonomous travel control. In FIGS. 5A to 5D, it is assumed that the subject vehicle V travels to the right and a person H as an object stands still. It is also assumed that the object detectors 13 and the pattern display devices 22 are attached as illustrated in FIG. 2, and the reference numerals 13a to 13h and 22a to 22h are omitted in the figures. In this case, patterns P when no object is detected by the object detectors 13 have areas correlating with respective detection ranges of the object detectors 13, while the display area of a pattern P is made smaller as the distance between the subject vehicle V and the detected object (here, the person H) is closer.

Figure 5A:
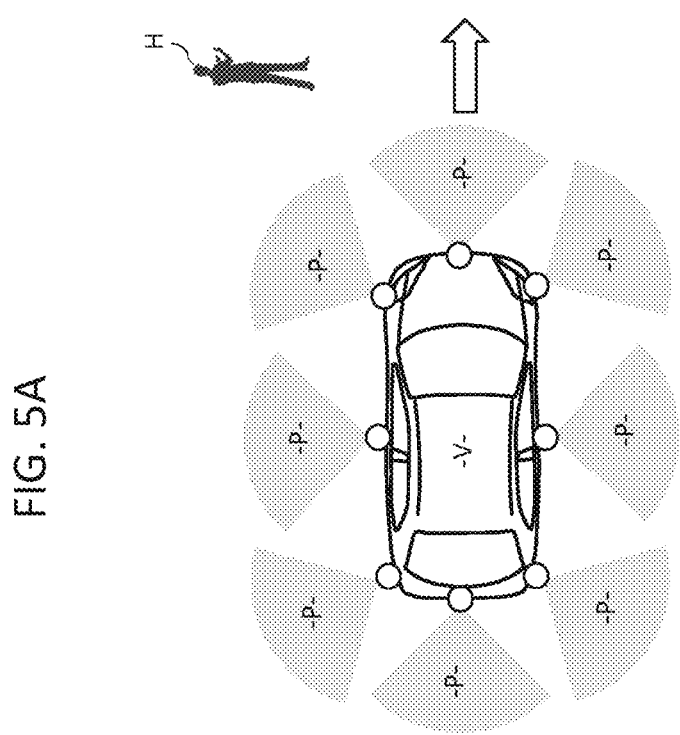
FIG. 5A is a plan view (part 1) illustrating an example of display form of the patterns which are displayed at certain positions on the road surface by the pattern display devices of FIG. 1.
Figure 5B:
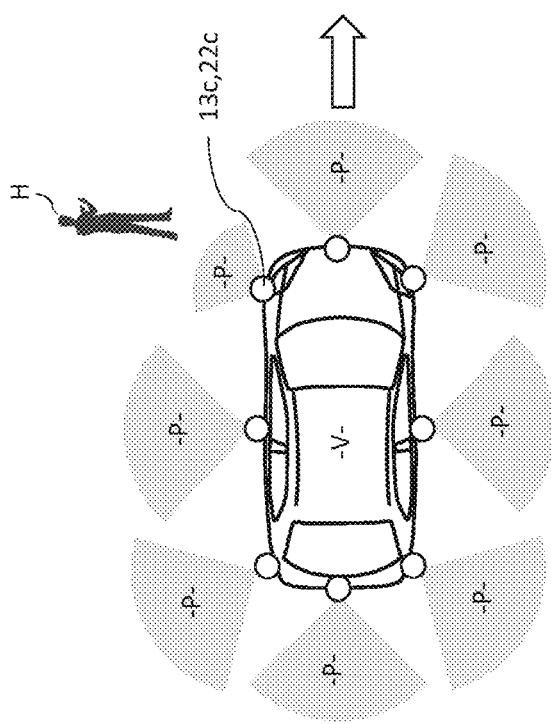
FIG. 5B is a plan view (part 2) illustrating an example of display form of the patterns which are displayed at certain positions on the road surface by the pattern display devices of FIG. 1.
Figure 5D:
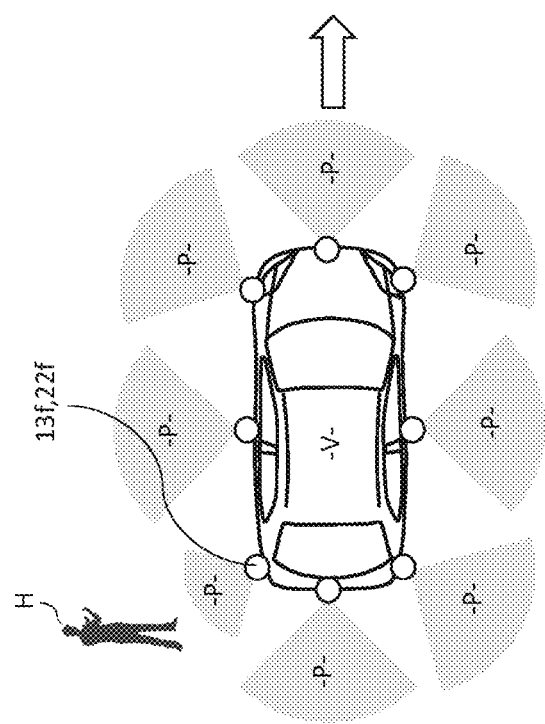
FIG. 5D is a plan view (part 4) illustrating an example of display form of the patterns which are displayed at certain positions on the road surface by the pattern display devices of FIG. 1.

In the state illustrated in FIG. 5A, none of the eight object detectors 13a to 13h attached to the subject vehicle V detect the person H as an object, and therefore the patterns P illuminated on the road surface by the eight pattern display devices 22a to 22h are set to those having areas that correlate with respective detection ranges of the object detectors 13. Here, the area correlating with the detection range of an object detector 13 refers to the same area as the detection range of the object detector 13 as well as an area similar to the detection range of the object detector 13. On the other hand, when the subject vehicle V travels to the right and enters the state illustrated in FIG. 5B, the object detector 13c attached to the left front part of the subject vehicle V detects the person H as an object, and therefore the area of the pattern P displayed by the pattern display device 22c corresponding to the object detector 13c is made smaller than the areas of patterns P displayed by the other pattern display devices (this operation may include turning off the pattern display device 22c).

When the subject vehicle V further travels to the right and enters the state illustrated in FIG. 5C, the object detector 13h attached to the left side part of the subject vehicle V detects the person H as an object, and therefore the area of the pattern P displayed by the pattern display device 22h corresponding to the object detector 13h is made smaller than the areas of patterns P displayed by the other pattern display devices (this operation may include turning off the pattern display device 22h). At this time, the area of the pattern P displayed by the pattern display device 22c, which has been reduced earlier, is returned to the original area. When the subject vehicle V further travels to the right and enters the state illustrated in FIG. 5D, the object detector 13f attached to the left rear part of the subject vehicle V detects the person H as an object, and therefore the area of the pattern P displayed by the pattern display device 22f corresponding to the object detector 13f is made smaller than the areas of patterns P displayed by the other pattern display devices (this operation may include turning off the pattern display device 22f). At this time, the area of the pattern P displayed by the pattern display device 22h, which has been reduced earlier, is returned to the original area.

Thus, as illustrated in FIGS. 5A to 5D in sequence, when the subject vehicle V passes by the person H, the display by the pattern display device 22 corresponding to the object detector 13 detecting the person H is displayed at a certain position on the road surface toward the detection range so as to be a predetermined pattern P corresponding to the detection range for the person H. In the example illustrated in the figures, the area of the pattern is reduced so as not to include the detected person H. Through this operation, the person H present around the subject vehicle V can visually recognize the pattern P displayed on the road surface and the size of the pattern P thereby to recognize that the subject vehicle V is detecting the person H, that is, the person H is not included in the range in which the subject vehicle V travels autonomously, that is, the subject vehicle V does not come into contact with the person H.

«Second Example of Display Form»

Figure 6:
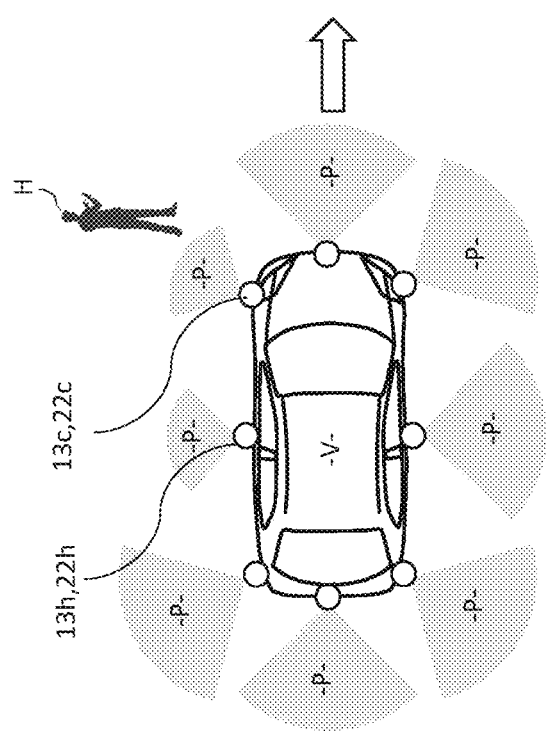
FIG. 6 is a plan view illustrating another example of display form of the patterns which are displayed at certain positions on the road surface by the pattern display devices of FIG. 1.

FIG. 6 is a plan view illustrating another example of display form in which patterns P are displayed by respective pattern display devices 22a to 22h at certain positions on the road surface toward the detection ranges of the object detectors 13a to 13h in a scene similar to the scenes illustrated in FIGS. 5A to 5D. In the example of display form illustrated in FIGS. 5A to 5D, the detection range is changed only for the pattern display device corresponding to the object detector 13 detecting the person H, but in the example of display form illustrated in FIG. 6, when an object such as the person H is detected, a predetermined pattern P corresponding to the detection range is displayed not only at a certain position on the road surface toward the person H but also at a position to which the person H relatively moves thereafter. That is, as illustrated in FIG. 6, when the subject vehicle V travels to the right and the person H stands still, the person H is detected by the object detector 13c at the current position of the subject vehicle V, and therefore the area of the pattern P by the pattern display device 22c corresponding to the object detector 13c is reduced. In addition to this, the subject vehicle V further travels to the right after that, and therefore the person H is to be detected by the object detector 13h. Accordingly, this situation is foreseen, and the area of the pattern P by the pattern display device 22h corresponding to the object detector 13h, which is to detect the person H thereafter, is also reduced at the same time.

To this end, the road surface display pattern setting device 21 calculates the moving speed of the object from the temporal change of the object position detected by the object detector 13 and receives the vehicle speed of the subject vehicle V generated by the target vehicle speed generator 18 to calculate the relative moving speed between the object and the subject vehicle V. Then, from the current position of the subject vehicle V, the position to which the object moves thereafter is calculated, and a determination is made as to which object detector 13 detects this position. Thus, the pattern P displayed on the road surface is changed not only for the object detected at the current position of the subject vehicle V but also for the object to be detected thereafter. The person H who visually recognizes this can visually recognize the pattern P displayed on the road surface and the size and position of the pattern P thereby to recognize that the subject vehicle V is detecting the person H, that is, the person H is not included in the range in which the subject vehicle V travels autonomously, that is, the subject vehicle V does not come into contact with the person H, up to the situation thereafter.

《 Third Example of Display Form 》

Figure 7:
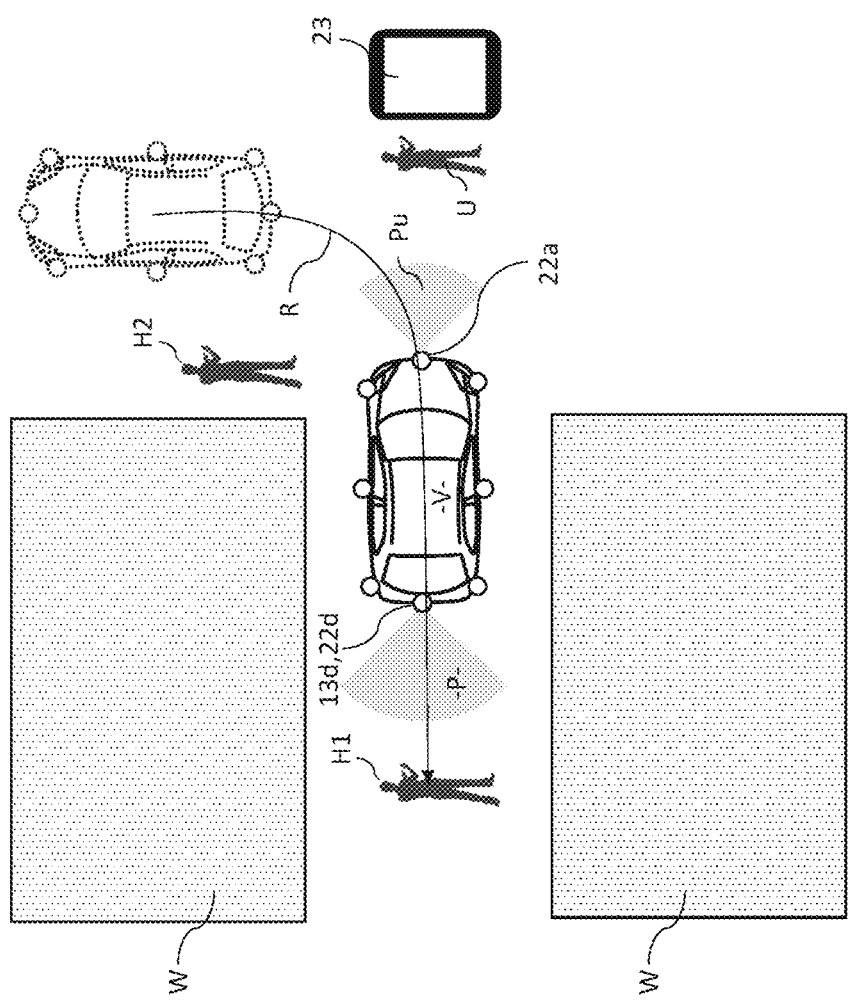
FIG. 7 is a plan view illustrating still another example of display form of the patterns which are displayed at certain positions on the road surface by the pattern display devices of FIG. 1.

FIG. 7 is a plan view illustrating still another example of display form in which patterns P are displayed by respective pattern display devices 22a to 22h at certain positions on the road surface toward the detection ranges of the object detectors 13a to 13h in a scene of executing the autonomous travel control, for example, in the autonomous parking mode. In the examples of display form illustrated in FIGS. 5A to 5D and FIG. 6, the predetermined patterns P corresponding to the detection ranges are displayed using all of the pattern display devices 22, which include the pattern display device corresponding to the object detector 13 detecting the person H and the pattern display device corresponding to the object detector 13 expected to detect the person H thereafter, but in this example, one or more predetermined patterns P corresponding to a detection range are displayed on the road surface using one or more specific pattern display devices 22.

For example, when the object detectors 13a to 13h detect two or more objects, the road surface display pattern setting device 21 reads the traveling speed of the subject vehicle V from the target vehicle speed generator 18, calculates a time-to-collision for the subject vehicle V to collide with each of the detected objects, and displays only the predetermined pattern P for an object having the shortest time-to-collision, at a certain position on the road surface toward the object using the pattern display device 22 corresponding to the object detector 13 for the object. This will be more specifically described. As illustrated in FIG. 7, when two persons H1 and H2 are present around the subject vehicle V and the subject vehicle V is parked backward along the parking route R, the subject vehicle V moves away from the person H2 while approaching the person H1. Accordingly, the object having the shortest time-to-collision for the subject vehicle V is the person H1 detected by the object detector 13d, rather than the person H2. The pattern display device 22d corresponding to the object detector 13d is therefore used to display the pattern P for the detection range on the road surface toward the person H1. Through this operation, the person H1 can visually recognize the pattern P displayed on the road surface and the size and position of the pattern P thereby to recognize that the subject vehicle V is detecting the person H1, that is, the person H1 is not included in the range in which the subject vehicle V travels autonomously, that is, the subject vehicle V does not come into contact with the person H1.

In this example, the operator U who got off the vehicle operates the remote operation device 23 thereby to perform the autonomous parking control of the subject vehicle V. The road surface display pattern setting device 21 reads the position of the remote operation device 23 from the position detector 14 for the remote operation device 23. When the object detector 13 detects an object, or the person H1 herein, the predetermined pattern P is displayed toward the person H1 as described above, and at the same time, a pattern Pu corresponding to the predetermined pattern P displayed toward the person H1 is also displayed at a certain position on the road surface toward the remote operation device 23 using the pattern display device 22a so that the pattern Pu is visible. Such an operation allows the operator U to recognize the presence of the object (person H1) even when the person H1 is standing at a position that is a blind spot from the operator U.

In the above examples, when the object detector 13 detects an object, the predetermined pattern displayed toward the object is reduced to a pattern that does not include the object and the reduced pattern is displayed, but the color of the predetermined pattern P displayed toward the object may be set to a color different from the color of the predetermined pattern P displayed when no object is detected. Additionally or alternatively, when an object is detected, the blinking pattern of the predetermined pattern P displayed toward the object may be set to a blinking pattern different from the blinking pattern of the predetermined pattern P displayed when no object is detected.

The above examples of display form are processed by the pattern display device 22 which is controlled by the road surface display pattern setting device 21, but any one of these examples of display form may be processed by the road surface display pattern setting device 21. Additionally or alternatively, the remote operation device 23 may be provided with a switch for selecting the display form processed by the road surface display pattern setting device 21 so that the operator U can select the display form such as during the remote operation. Additionally or alternatively, upon the display of the pattern P by the pattern display device 22, when the detected object is the person H, the road surface display pattern setting device 21 may continue to display the pattern for a predetermined time even after the subject vehicle V stops. Additionally or alternatively, when the detected object is the person H, a different pattern informing that the subject vehicle V decelerates and stops may be displayed even if the person H is away from the subject vehicle V.

Figure 8:
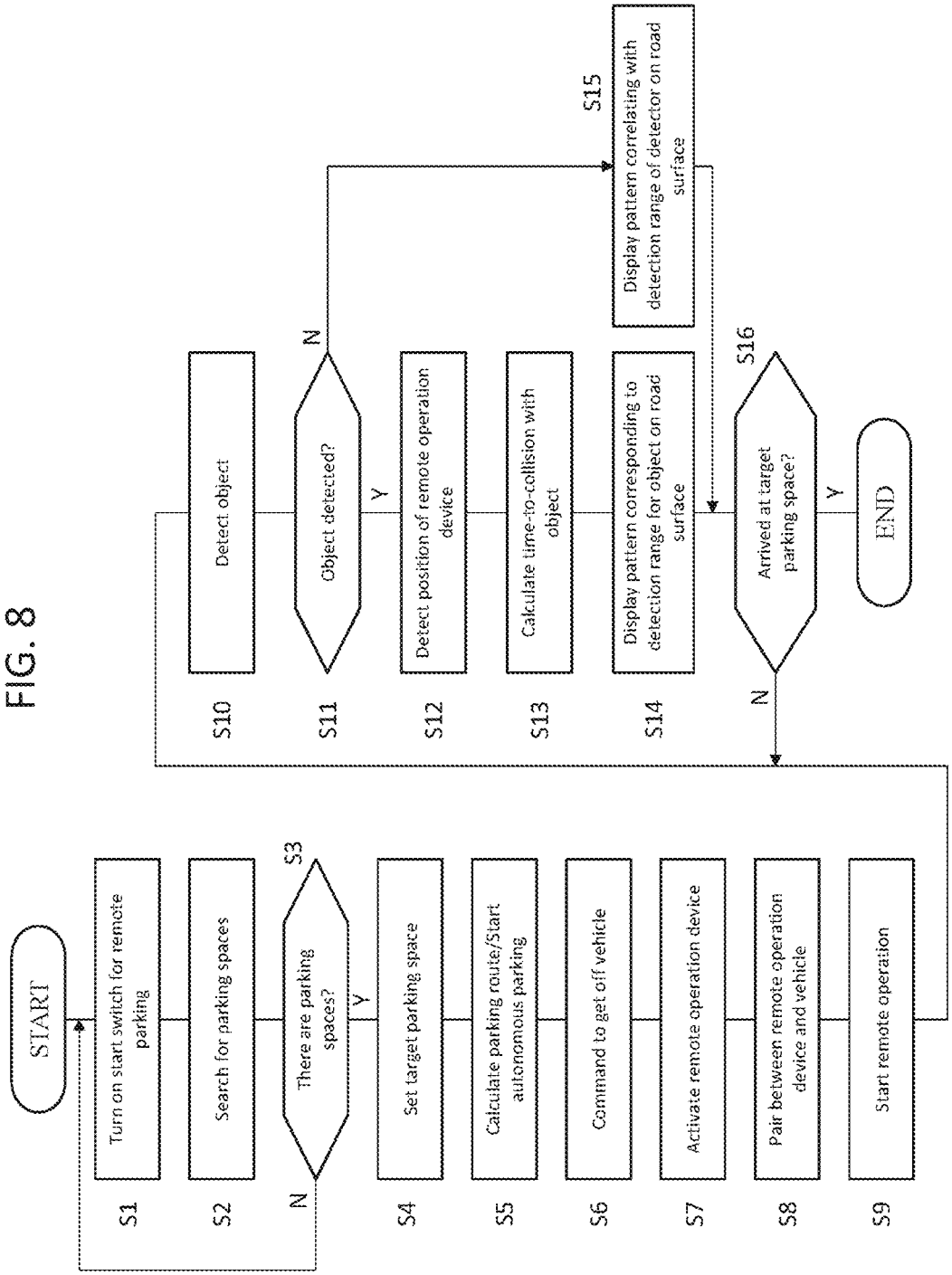
FIG. 8 is a flowchart illustrating the control procedure executed in the remote parking system of FIG. 1.

The control flow of the remote parking system 1 according to one or more embodiments of the present invention will then be described with reference to FIG. 8. Here, a scene will be described in which the reverse parking illustrated in FIGS. 9A to 9D is executed by the remote autonomous parking control. First, as illustrated in FIG. 9A, when the subject vehicle V arrives in the vicinity of parking spaces, in step S1, the operator U such as the driver turns on the remote parking start switch of the onboard target parking space setting device 11 to select the remote entry mode. In step S2, the target parking space setting device 11 searches for one or more available parking spaces for the subject vehicle V using a plurality of onboard cameras or the like. In step S3, the target parking space setting device 11 determines whether or not there are one or more available parking spaces. When there are one or more available parking spaces, the process proceeds to step S4, while when there are no available parking spaces, the process returns to step S1. When no available parking spaces are detected in step S2, the operator may be informed of this fact via a language display or voice, such as "there are no parking spaces," and this process may be concluded.

In step S4, the target parking space setting device 11 controls the onboard display to displays available parking spaces PS1, PS2, and PS3 and encourages the operator U to select a desired parking space. When the operator U selects a specific parking space PS1 as a target parking space, the target parking space setting device 11 outputs the target parking position information to the parking route generator 15. In step S5, the parking route generator 15 generates parking routes R1 and R2 illustrated in FIGS. 9B to 9D from the current position of the subject vehicle V and the target parking position, and the object deceleration calculator 16 calculates the deceleration start timing in the autonomous parking control on the basis of the object information detected by the object detector 13. The parking routes generated by the parking route generator 15 are output to the route following controller 17, and the deceleration start timing calculated by the object deceleration calculator 16 is output to the target vehicle speed generator 18.

Through the above processes, the autonomous parking control comes into a standby state. When the operator U is encouraged to accept the start of the autonomous parking control and then accepts the start, the autonomous parking control is started. In the reverse parking illustrated in FIG. 9A, once the vehicle moves forward from the current position illustrated in FIG. 9A and reaches the position of turn for parking illustrated in FIG. 9B, the operator U is encouraged to get off the vehicle in step S6. Then, as illustrated in FIG. 9C, the vehicle moves backward while steering to the left and moves straight to the parking space PS1 illustrated in FIG. 9D.

When the operator U gets off with the remote operation device 23 in step S6 during the execution of such autonomous parking control, the operator U activates the remote operation device 23 in step S7. The subject vehicle V is in a stop state during steps S6 to S9. In step S8, the pairing process between the remote operation device 23 and the subject vehicle V is performed. When the pairing process enables the subject vehicle V to authenticate the remote operation device 23 so that the command can be received, the remote operation is started in step S9, and the operator U continues to press the execution button of the remote operation device 23 thereby to maintain the execution of the remote parking control. On the other hand, when the operator U presses the stop button of the remote operation device 23 (or releases the execution button), the stop command for the remote parking control is transmitted to the route following controller 17 and the target vehicle speed generator 18 (these may alternatively be the steering angle controller 19 and the vehicle speed controller 20), and the remote parking control is suspended. In the case in which the safety is confirmed while the remote parking control is suspended or in other similar cases, the operator U continues to press the execution button of the remote operation device 23 again, and the execution of the remote parking control is thereby resumed.

When the operator U gets out of the vehicle and continues to press the execution button of the remote operation device 23, the route following controller 17 sequentially outputs the target steering angle along the parking routes R1 and R2 to the steering angle controller 19, and the target vehicle speed generator 18 sequentially outputs the target vehicle speed along the parking routes R1 and R2 to the vehicle speed controller 20. This allows the subject vehicle V to execute the autonomous parking control along the parking routes R1 and R2 at the target vehicle speed. During this operation, the object detector 13 detects, in step S10, the presence or absence of an object such as a person H or an obstacle W present around the subject vehicle V. When an object is detected in step S11, the process proceeds to step S12, while when no object is detected, the process proceeds to step S15. The processes from step S10 to step S16, which is to be described later, are executed at predetermined time intervals until the subject vehicle V arrives at the target parking space in step S16.

The processes from step S12 to step S15 are executed in accordance with the above-described examples of display form of the patterns P which are set by the road surface display pattern setting device 21. This will be more specifically described. In step S12, the road surface display pattern setting device 21 detects the position of the remote operation device 23 held by the operator U. The execution continuation command for the remote operation from the remote operation device 23 to the subject vehicle V is performed through the short-range communication from the antenna 231 of the remote operation device 23 to the antennas 24 and 24 of the vehicle V; therefore, radio field intensity sensors provided in the subject vehicle V are used to detect the radio field intensities between the antennas 24 and 24 of the vehicle V and the antenna 231 of the remote operation device, and the position of the remote operation device 23 is calculated using a triangulation method or the like. The positions to which the antennas 24 and 24 of the vehicle are attached and the distances between the antennas are known, so the relative position of the remote operation device 23 with respect to the subject vehicle V can be calculated. In the above-described third example of display form (FIG. 7), the pattern Pu is displayed by the pattern display 22a at a certain position on the road surface toward the remote operation device 23 from the subject vehicle V, and the position of the remote operation device 23 is therefore detected in step S12. If the patterns P are displayed regardless of the position of the remote operation device 23 as in other examples of display form, step S12 may be omitted.

In step S13, the road surface display pattern setting device 21 calculates the time-to-collision for the subject vehicle V to collide with an object such as an obstacle detected by the object detector 13. The distance to the obstacle is detected by the object detector 13 and the target vehicle speed is generated by the target vehicle speed generator 18; therefore, the time TTC for the subject vehicle V to collide with the object is calculated based on these information items. In the above-described third example of display form (FIG. 7), the pattern P of the detection range corresponding to the person H1 having the shortest time TTC for the vehicle to collide with the object is displayed on the road surface using the pattern display device 22d, and the time-to-collision TTC is therefore calculated in step S13. If the patterns P are displayed regardless of the time-to-collision TTC for the vehicle to collide with an object as in other examples of display form, step S13 may be omitted.

In step S14, the road surface display pattern setting device 21 controls the pattern display device 22 to display a pattern P corresponding to the detection range for an object at a certain position on the road surface toward the detection range. The pattern corresponding to the detection range for an object as referred to herein is meant to include any of the above-described first example of display form to third example of display form. That is, examples of displaying the pattern include a case in which, as in the first example of display form (FIGS. 5A to 5D), when the subject vehicle V passes by the person H, the display by the pattern display device 22 corresponding to the object detector 13 detecting the person H is displayed at a certain position on the road surface toward the detection range so as to be a predetermined pattern P corresponding to the detection range for the person H. In the example illustrated in the figures, the area of the pattern is reduced so as not to include the detected person H. Examples of displaying the pattern also include a case in which, as in the second example of display form (FIG. 6), when an object such as the person H is detected, a predetermined pattern P corresponding to the detection range is displayed not only at a certain position on the road surface toward the person H but also at a position to which the person H relatively moves thereafter. Examples of displaying the pattern also include a case in which, as in the third example of display form (FIG. 7), only the predetermined pattern P for an object (person H1) having the shortest time-to-collision is displayed at a certain position on the road surface toward the object (person H1) using the pattern display device 22d corresponding to the object detector 13d for the object. Examples of displaying the pattern also include a case in which, as in the third example of display form (FIG. 7), a pattern Pu corresponding to the predetermined pattern P displayed toward the person H1 is also displayed at a certain position on the road surface toward the remote operation device 23 using the pattern display device 22a so that the pattern Pu is visible.

In the scene of FIG. 9A, two persons H1 and H2 are standing around the subject vehicle V, but the persons H1 and H2 are not detected by the object detectors 13; therefore, the road surface display pattern setting device 21 sets the patterns displayed by the pattern display devices 22a to 22h corresponding to respective object detectors 13a to 13h to patterns having areas that correlate with the detection ranges. In the scene illustrated in FIG. 9B, the person H is detected by the object detector 13b; therefore, the pattern P displayed by the pattern display device 22b corresponding to the object detector 13b is reduced or turned off. Likewise, in the scene illustrated in FIG. 9C, the person H is detected by the object detector 13h; therefore, the pattern P displayed by the pattern display device 22h corresponding to the object detector 13h is reduced or turned off. Likewise, in the scene illustrated in FIG. 9D, the person H is detected by the object detector 13c; therefore, the pattern P displayed by the pattern display device 22c corresponding to the object detector 13c is reduced or turned off.

When no object is detected by the object detectors 13a to 13h, in step S15, the road surface display pattern setting device 21 sets the patterns displayed by the pattern display devices 22a to 22h corresponding to respective object detectors 13a to 13h to patterns having areas that correlate with the detection ranges. The determination executed in step S11 is performed for each of the object detectors 13a to 13h, and the display of the patterns P in steps S14 and S15 for this determination is also performed by the pattern display devices 22a to 22h corresponding to respective object detectors 13a to 13h.

In step S16, a determination is made whether or not the subject vehicle V has arrived at the target parking space. When the subject vehicle V has not arrived, the process returns to step S10, while when the subject vehicle V has arrived at the target parking space, the above autonomous parking control is concluded.

As described above, according to the remote parking system 1 of one or more embodiments of the present invention, when the autonomous travel control is performed for the subject vehicle V having the autonomous travel control function, whether or not an object such as the person H is present around the subject vehicle V is searched for. When an object is detected, a predetermined pattern corresponding to the detection range is displayed at a certain position on the road surface toward the detection range. Through this operation, the person H present around the subject vehicle V can visually recognize the pattern P displayed on the road surface and the size of the pattern P thereby to recognize that the subject vehicle V is detecting the person H, that is, the person H is not included in the range in which the subject vehicle V travels autonomously, that is, the subject vehicle V does not come into contact with the person H.

According to the remote parking system 1 of one or more embodiments of the present invention, when an object such as the person H is detected, the predetermined pattern displayed toward the object is reduced to a pattern that does not include the object and the reduced pattern is displayed; therefore, only by visually recognizing the pattern P, the person H can sensuously recognize that the subject vehicle V is detecting the person H, that is, the person H is not included in the range in which the subject vehicle V travels autonomously, that is, the subject vehicle V does not come into contact with the person H.

According to the remote parking system 1 of one or more embodiments of the present invention, when an object such as the person H is detected, the color of the predetermined pattern displayed toward the object is set to a color different from the color of the predetermined pattern displayed when no object is detected; therefore, only by visually recognizing the pattern P, the person H can sensuously recognize that the subject vehicle V is detecting the person H, that is, the person H is not included in the range in which the subject vehicle V travels autonomously, that is, the subject vehicle V does not come into contact with the person H.

According to the remote parking system 1 of one or more embodiments of the present invention, when an object such as the person H is detected, the blinking pattern of the predetermined pattern displayed toward the object is set to a blinking pattern different from the blinking pattern of the predetermined pattern displayed when no object is detected; therefore, only by visually recognizing the pattern P, the person H can sensuously recognize that the subject vehicle V is detecting the person H, that is, the person H is not included in the range in which the subject vehicle V travels autonomously, that is, the subject vehicle V does not come into contact with the person H.

According to the remote parking system 1 of one or more embodiments of the present invention, when the subject vehicle V is controlled to enter a given space by the autonomous travel control or exit a given space by the autonomous travel control on the basis of an execution command or a stop command from the remote operation device 23 located outside the subject vehicle V, the position of the remote operation device 23 is detected, and when an object such as the person H is detected, the predetermined pattern P is displayed toward the object and, at the same time, a pattern Pu corresponding to the predetermined pattern P is displayed at a certain position on the road surface toward the remote operation device 23 so that the pattern Pu is visible; therefore, the operator U can recognize the presence of the object (person H1) even when the person H1 is standing at a position that is a blind spot from the operator U.

According to the remote parking system 1 of one or more embodiments of the present invention, when two or more objects are detected, the traveling speed of the subject vehicle V is detected, the time-to-collision TTC for the subject vehicle V to collide with each of the detected objects is calculated, and only the predetermined pattern P for an object having the shortest time-to-collision TTC is displayed at a certain position on the road surface toward the object; therefore, only the necessary information can be appropriately displayed, and only by visually recognizing the pattern P, the person H can recognize that the subject vehicle V is detecting the person H, that is, the person H is not included in the range in which the subject vehicle V travels autonomously, that is, the subject vehicle V does not come into contact with the person H.

According to the remote parking system 1 of one or more embodiments of the present invention, when an object such as the person H is detected, the relative speed between the subject vehicle and the object is detected, the position to which the object relatively moves after detection of the relative speed is calculated based on the relative speed, and the predetermined pattern P is displayed at each of the certain position on the road surface toward the object and a certain position on the road surface toward the position to which the object relatively moves; therefore, the person H who visually recognizes this can visually recognize the pattern P displayed on the road surface and the size and position of the pattern P thereby to recognize that the subject vehicle V is detecting the person H, that is, the person H is not included in the range in which the subject vehicle V travels autonomously, that is, the subject vehicle V does not come into contact with the person H, up to the situation thereafter.

The above steering angle controller 19 and vehicle speed controller 20 correspond to the travel controller according to the present invention, the above target parking space setting device 11, parking route generator 15, route following controller 17, and target vehicle speed generator 18 correspond to the controller according to the present invention, and the above road surface display pattern setting device 21 and the above position detector 14 for the remote operation device 23 correspond to the display controller according to the present invention.

DESCRIPTION OF REFERENCE NUMERALS

1 Remote parking system
11 Target parking space setting device
12 Vehicle position detector
13 Object detector
14 Position detector for remote operation device
15 Parking route generator
16 Object deceleration calculator
17 Route following controller
18 Target vehicle speed generator
19 Steering angle controller
20 Vehicle speed controller
21 Road surface display pattern setting device
22 Pattern display device
23 Remote operation device
231 Antenna
24 Antenna
V Subject vehicle
V1 to V6 Other vehicles
P, Pu Pattern to be displayed
PS1, PS2, PS3 Parking space
S Exit space
U Operator
H, H1, H2 Person (object)
W Obstacle (object)

The invention claimed is:

1. A vehicle travel control method comprising:
when controlling a vehicle having an autonomous travel control function to travel autonomously, detecting whether or not an object is present around the vehicle using an object detector;
displaying a predetermined pattern corresponding to a detection range of the object detector at a certain position on a road surface toward the detection range so as to be visible when no object is detected; and
upon change from a state of not detecting the object to a state of detecting the object, changing the predetermined pattern to a pattern different from the pattern displayed until then.

2. The vehicle travel control method according to claim 1, comprising, when detecting the object, reducing the predetermined pattern displayed toward the object to a pattern that does not include the object and displaying the reduced pattern.

3. The vehicle travel control method according to claim 1, comprising, when detecting the object, setting a color of the predetermined pattern displayed toward the object to a color different from the color of the predetermined pattern displayed when the object is not detected.

4. The vehicle travel control method according to claim 1, comprising, when detecting the object, setting a blinking pattern of the predetermined pattern displayed toward the object to a blinking pattern different from the blinking pattern of the predetermined pattern displayed when the object is not detected.

5. The vehicle travel control method according to claim 1, comprising:
when controlling the vehicle to autonomously enter or exit a given space on a basis of an execution command or a stop command from a remote operation device located outside the vehicle, detecting a position of the remote operation device; and
upon detection of the object, displaying the predetermined pattern toward the object and concurrently displaying a pattern corresponding to the predetermined pattern at a certain position on the road surface toward the remote operation device so that the pattern is visible.

6. The vehicle travel control method according to claim 1, comprising:
when detecting two or more objects, detecting a traveling speed of the vehicle;
calculating a time-to-collision for the vehicle to collide with each of the detected objects; and
displaying, at the certain position on the road surface toward the object, only the predetermined pattern for an object having the shortest time-to-collision.

7. The vehicle travel control method according to claim 1, comprising:
when detecting the object, detecting a relative speed between the vehicle and the object;
calculating, on a basis of the relative speed, a position to which the object relatively moves after detection of the relative speed; and
displaying the predetermined pattern at each of the certain position on the road surface toward the object and a certain position on the road surface toward the position to which the object relatively moves.

8. A vehicle travel control apparatus comprising:
a travel controller configured to control a vehicle having an autonomous travel control function to travel autonomously;

a controller configured to calculate a travel route of the vehicle and output a travel command to the travel controller;
an object detector configured to search for whether or not an object is present around the vehicle;
a pattern display device configured to display a visible pattern on a road surface; and
a display controller configured to control the pattern display device so that, a predetermined pattern corresponding to a detection range of the object detector is displayed at a certain position on a road surface toward the detection range so as to be visible when no object is detected, and upon change from a state of not detecting the object to a state of detecting the object, the predetermined pattern is changed to a pattern different from the pattern displayed until then.

* * * * *